US012587053B2

(12) United States Patent
Danci et al.

(10) Patent No.: US 12,587,053 B2
(45) Date of Patent: Mar. 24, 2026

(54) STATOR FOR ELECTRIC MACHINE AND METHOD OF MANUFACTURING SAID STATOR

(71) Applicant: ABB Schweiz AG, Baden (CH)

(72) Inventors: Alex Danci, Vaasa (FI); Jouni Ikäheimo, Vaasa (FI)

(73) Assignee: ABB Schweiz AG, Baden (CH)

( * ) Notice: Subject to any disclaimer, the term of this patent is extended or adjusted under 35 U.S.C. 154(b) by 216 days.

(21) Appl. No.: 18/505,285

(22) Filed: Nov. 9, 2023

(65) Prior Publication Data

US 2024/0162774 A1 May 16, 2024

(30) Foreign Application Priority Data

Nov. 14, 2022 (EP) ..................................... 22207177

(51) Int. Cl.
| | |
|---|---|
| *H02K 3/26* | (2006.01) |
| *H02K 3/12* | (2006.01) |
| *H02K 15/021* | (2025.01) |
| *H02K 15/062* | (2025.01) |
| *H02K 15/085* | (2006.01) |

(52) U.S. Cl.
CPC ................. *H02K 3/26* (2013.01); *H02K 3/12* (2013.01); *H02K 15/021* (2025.01); *H02K 15/062* (2013.01); *H02K 15/085* (2013.01); *H02K 2203/03* (2013.01)

(58) Field of Classification Search
CPC ........ H02K 3/12; H02K 15/062; H02K 11/20; H02K 15/021; H02K 15/085; H02K 11/0094; H02K 3/26; H02K 1/16
See application file for complete search history.

(56) References Cited

U.S. PATENT DOCUMENTS

| | | | |
|---|---|---|---|
| 10,283,256 B2 | 5/2019 | Bertels | |
| 10,574,112 B2 * | 2/2020 | Tomonaga | ............... H02K 1/02 |
| 2021/0296975 A1 * | 9/2021 | Hino | ...................... H02K 15/02 |

FOREIGN PATENT DOCUMENTS

| | | |
|---|---|---|
| DE | 102015221443 A1 | 5/2017 |
| WO | 2018185667 A1 | 10/2018 |

OTHER PUBLICATIONS

European Searcch Report; Application No. EP22207177; Completed: Apr. 21, 2023; 3 Pages.

* cited by examiner

*Primary Examiner* — Leda T Pham
(74) *Attorney, Agent, or Firm* — Whitmyer IP Group LLC

(57) ABSTRACT

A stator for an electric machine including a stator core including an outer shell, a plurality of stator teeth and a plurality of stator slots, wherein the plurality of stator slots is adapted to receive a stator winding of the electric machine; at least one auxiliary coil located adjacent to the stator core, and adapted to generate an auxiliary coil voltage during operation of the electric machine. The at least one auxiliary coil is located around at least a portion of one of the plurality of stator teeth such that said at least a portion of one of the plurality of stator teeth extends inside the at least one auxiliary coil.

13 Claims, 3 Drawing Sheets

STATOR FOR ELECTRIC MACHINE AND METHOD OF MANUFACTURING SAID STATOR

FIELD OF THE INVENTION

The present invention relates to a stator for an electric machine, and to a method of manufacturing said stator.

BACKGROUND OF THE INVENTION

A known electric machine assembly comprises an electric machine and auxiliary devices relating to the electric machine, such as condition monitoring sensors or automated greasers. The auxiliary devices require energy for operation. It is known to provide the required energy for the auxiliary devices by batteries, or by another type of external power source.

One of the disadvantages associated with the above known electric machine assembly is that batteries require maintenance, and providing electrical connection to an external power source renders the electric machine assembly complicated.

SUMMARY

An object of the present invention is to provide a stator for an electric machine and a method of manufacturing said stator so as to alleviate the above disadvantages. The objects of the invention are achieved by a stator for an electric machine and a method of manufacturing a stator for an electric machine which are described in the following.

The invention is based on the idea of providing a stator for an electric machine with an auxiliary coil located around a portion of one stator tooth.

An advantage of the stator of the invention is that the at least one auxiliary coil does not require any maintenance. In an embodiment the at least one auxiliary coil comprises a flexible printed circuit board winding, and the at least one auxiliary coil is formed separately from a stator core. In a further embodiment, the separately formed at least one auxiliary coil is adapted to be used in a product family having a plurality of electric machines of different sizes. Using the separately formed at least one auxiliary coil in electric machines of different sizes is enabled by providing for each of the at least one auxiliary coil a transverse tooth gap in one stator tooth, respectively.

BRIEF DESCRIPTION OF THE DRAWINGS

In the following the invention will be described in greater detail by means of preferred embodiments with reference to the attached drawings, in which.

DETAILED DESCRIPTION

Figure 1:
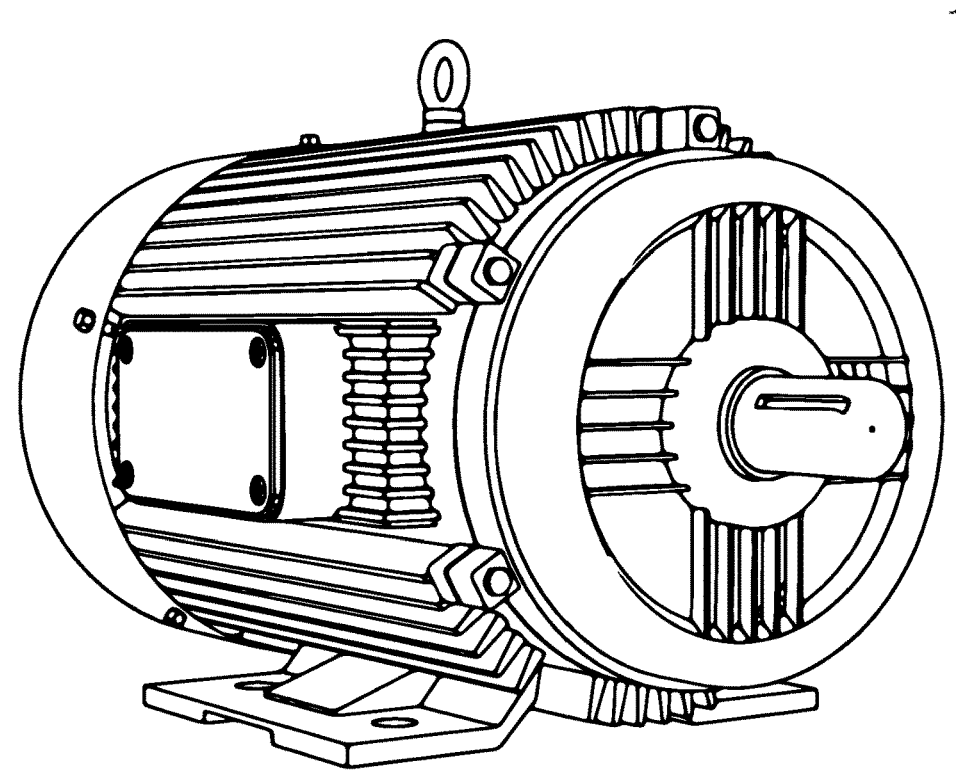
FIG. 1 shows an alternating-current machine according to an embodiment of the invention.

FIG. 1 shows an alternating-current machine according to an embodiment of the invention. The alternating-current machine comprises a frame, a stator immovably supported to the frame, and a rotor received in the stator, and rotatably supported to the frame.

Figure 2:
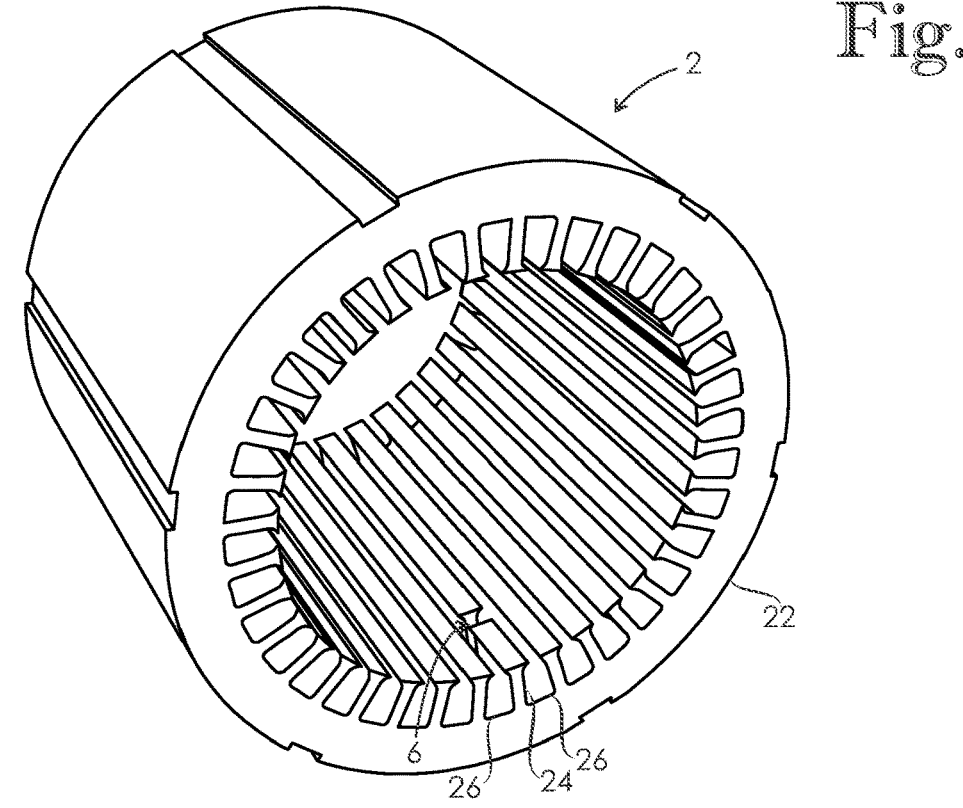
FIG. 2 shows a stator core of the alternating-current machine of FIG. 1.

FIG. 2 shows a stator core 2 of the alternating-current machine of FIG. 1. The stator core 2 comprises an outer shell 22, a plurality of stator teeth 24 and a plurality of stator slots 26, wherein the plurality of stator teeth 24 protrude radially inwards from the outer shell 22 such that each of the plurality of stator slots 26 is defined by adjacent stator teeth 24. The plurality of stator slots 26 is adapted to receive a stator winding of the electric machine. One of the plurality of stator teeth 24 comprises a transverse tooth gap 6.

Figure 3:
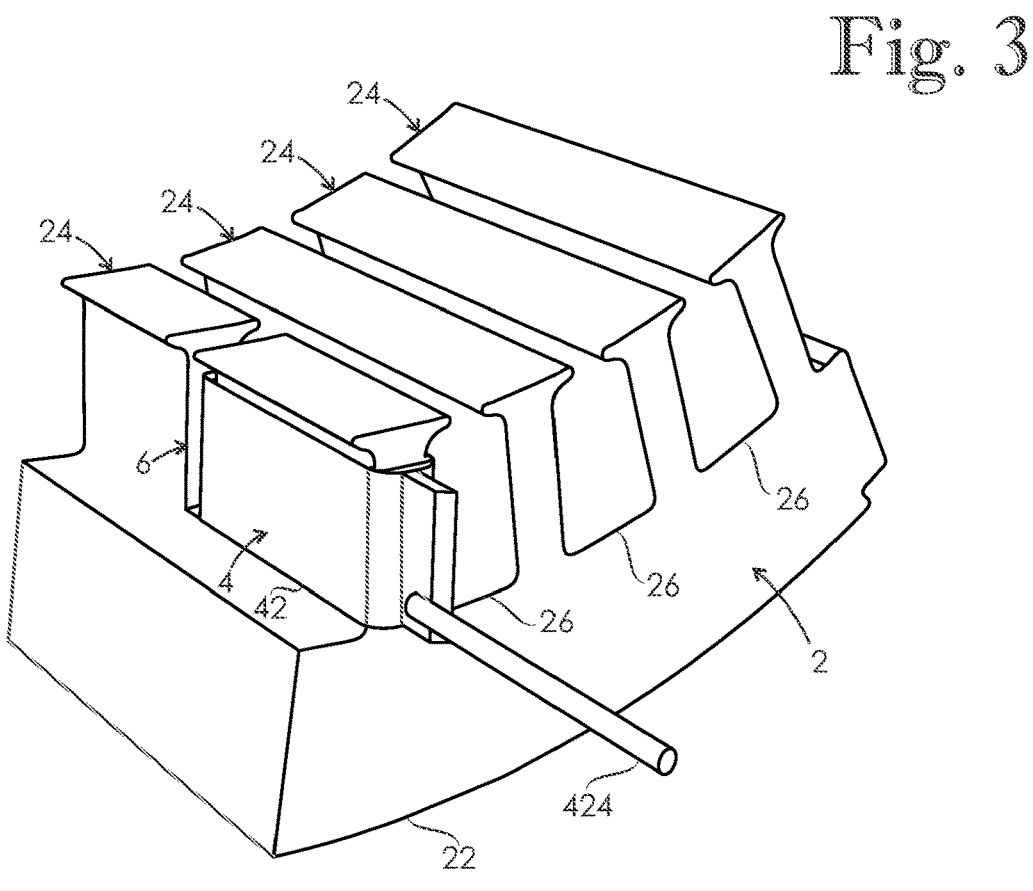
FIG. 3 shows a portion of the stator core of FIG. 2 and an auxiliary coil located around a portion of one stator tooth of the stator core.

FIG. 3 shows a portion of the stator core 2 of FIG. 2 and an auxiliary coil 4 located around a portion of one stator tooth 24 of the stator core 2. The portion of the stator tooth 24 extends inside the auxiliary coil 4. The auxiliary coil 4 is adapted to generate an auxiliary coil voltage during operation of the electric machine. The auxiliary coil voltage $U_{auxc}$ can be determined with an equation $U_{auxc}=B\cdot2\pi\cdot f\cdot A_{auxc}\cdot n_{ct}$, wherein B is magnetic flux density, f is frequency of the voltage present in the stator winding, $A_{auxc}$ is cross-sectional area of the auxiliary coil, and nct is number of coil turns in the auxiliary coil.

A dimension of the auxiliary coil 4 in an axial direction is less than a dimension of the stator tooth 24 in the axial direction, wherein the axial direction is parallel to a centre axis of the stator core 2 which is adapted to coincide with a rotation axis of the electric machine. A portion of the auxiliary coil 4 is received in the transverse tooth gap 6 extending in a direction perpendicular to both the axial direction and a radial direction.

The auxiliary coil 4 is adapted to be used in a plurality of different size electric machines. Using the auxiliary coil 4 in electric machines having stators of different sizes in the axial direction is enabled by the transverse tooth gaps. In an embodiment, the auxiliary coil is adapted to be used in a product family such that in the axially shortest electric machine of the product family, a transverse tooth gap is not required since the auxiliary coil is located around one complete stator tooth.

The auxiliary coil 4 is adapted to harvest energy for auxiliary devices, such as condition monitoring sensors or automated greasers. In an alternative embodiment, at least one auxiliary coil is adapted to operate as a sensor, such as a magnetic flux sensor or a temperature sensor.

The auxiliary coil 4 comprises a flexible printed circuit board winding 42 having a plurality of coil turns around the portion of one stator tooth 24. Each of the plurality of coil turns is located at the same distance from the portion of the stator tooth 24. The plurality of coil turns comprises a first coil turn and a second coil turn spaced part in the radial direction.

In an embodiment, the auxiliary coil comprises 5 to 50 coil turns. In another embodiment, the auxiliary coil comprises 15 to 35 coil turns.

Figure 4:
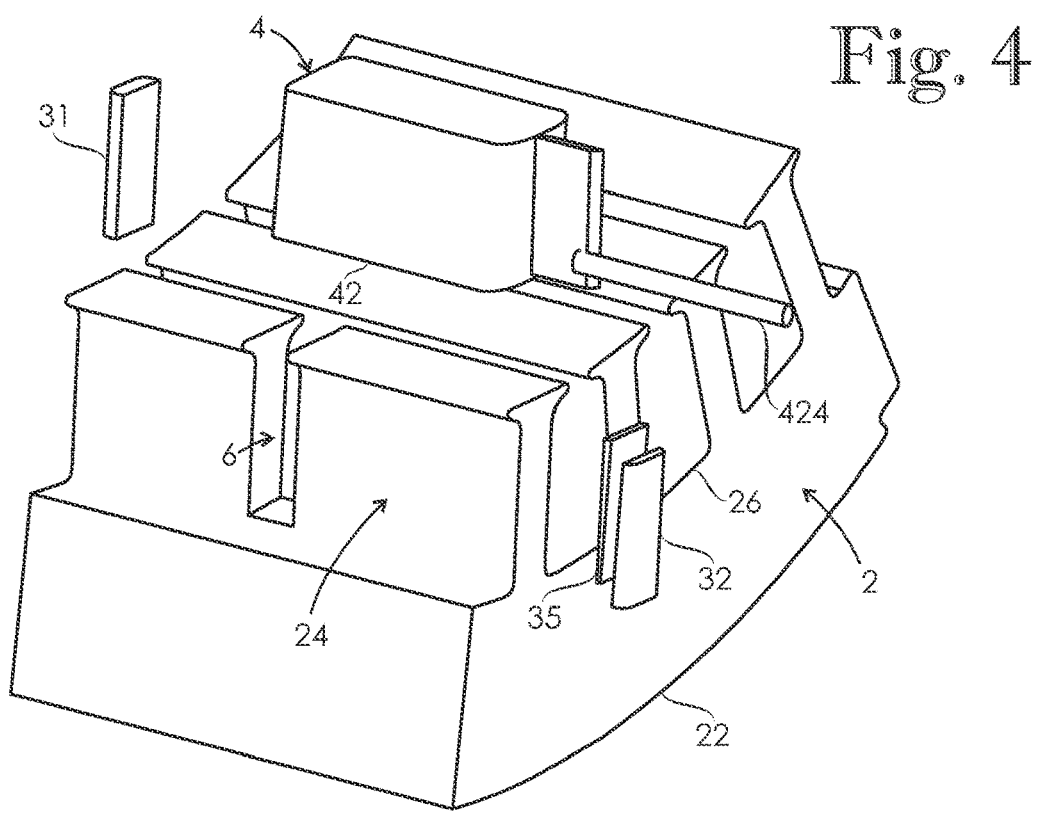
FIG. 4 shows the auxiliary coil and the portion of the stator core of FIG. 3 as separate parts.

FIG. 4 shows the auxiliary coil 4 and the portion of the stator core of FIG. 3 as separate parts. FIG. 4 also shows smoothing member 31 and 32, and a wedge member 35. In a complete stator, the smoothing members 31 and 32 and the wedge member 35 are located between the auxiliary coil 4 and the portion of the stator tooth 24.

Each of the smoothing members 31 and 32 is adapted to provide a smooth radius for the auxiliary coil 4 between a first lateral portion and a second lateral portion of the auxiliary coil 4. The first lateral portion and the second lateral portion are located on opposite sides of the portion of the stator tooth 24 in a direction perpendicular to both the axial direction and the radial direction.

The wedge member 35 is adapted to facilitate removing slack between the auxiliary coil 4 and the portion of the stator tooth 24. The auxiliary coil 4 is formed prior to locating the auxiliary coil 4 around the portion of the stator tooth 24. Subsequent to locating the auxiliary coil 4 around the portion of the stator tooth 24, the smoothing members 31 and 32 are pushed between the auxiliary coil 4 and the portion of stator tooth 24. Finally, the wedge member 35 is pushed between the smoothing member 32 and the portion of stator tooth 24.

In an alternative embodiment, the stator comprises a smoothing member between an auxiliary coil and a portion of stator tooth, wherein the smoothing member has a wedge shape such that no separate wedge member is required.

The stator core 2 comprises a plurality of stator sheets stacked in the axial direction. Each of the plurality of stator sheets has a plurality of stator sheet teeth such that the plurality of stator teeth 24 is composed of the plurality of stator sheet teeth of the plurality of stator sheets.

Figures 5A, 5B, 5C, 6A, 6B, 6C, 7:
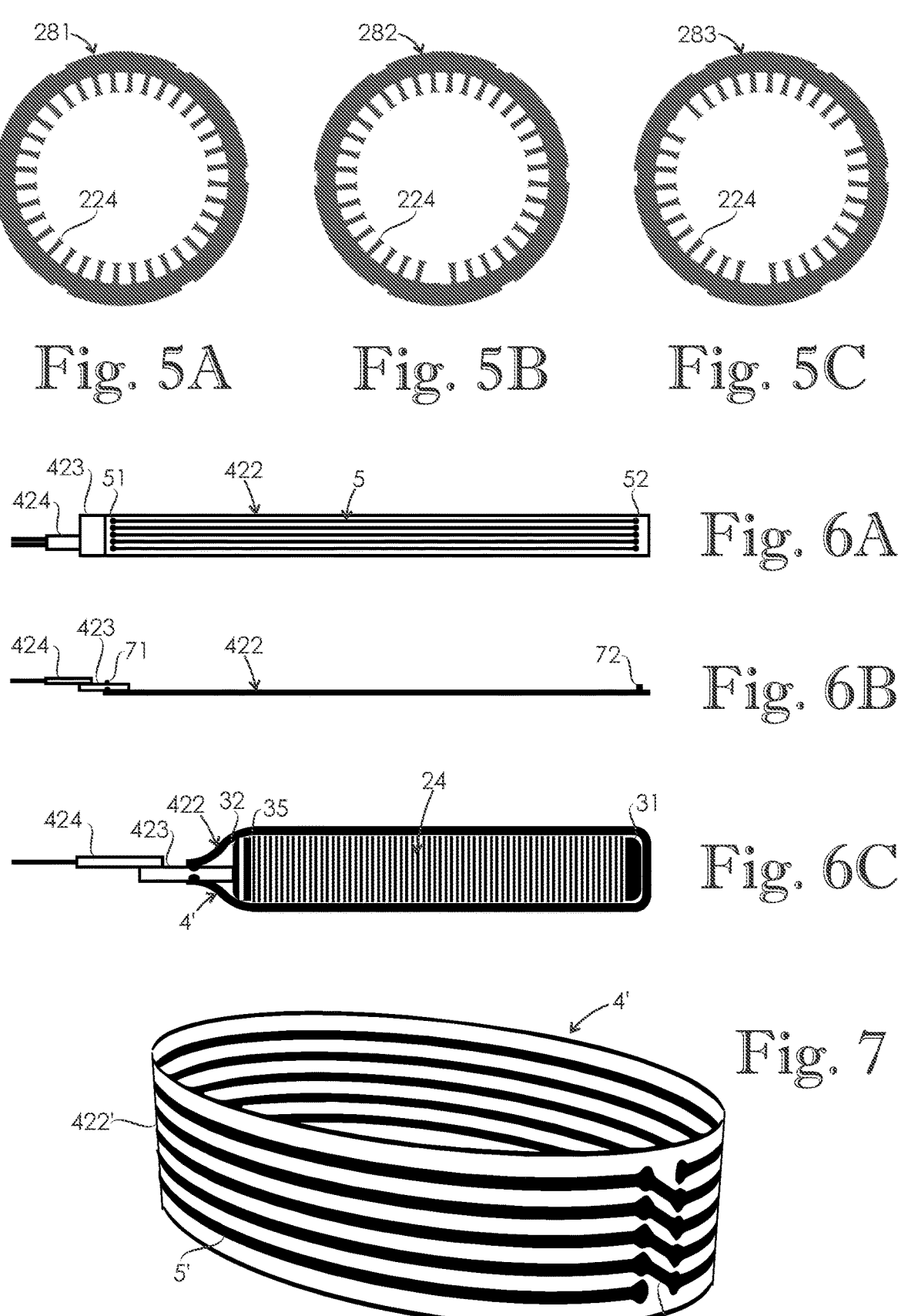
FIG. 5A shows a first stator sheet of the stator core of FIG. 2.
FIG. 5B shows a second stator sheet of the stator core of FIG. 2.
FIG. 5C shows a stator sheet of a stator core according to an alternative embodiment.
FIG. 6A shows a flexible printed circuit board sheet of the auxiliary coil shown in FIG. 3 from a direction perpendicular to a plane defined by the flexible printed circuit board sheet.
FIG. 6B shows the flexible printed circuit board sheet of FIG. 6A from a direction parallel to the plane defined by the flexible printed circuit board sheet.
FIG. 6C shows the auxiliary coil formed from the flexible printed circuit board sheet shown in FIG. 6A, wherein the auxiliary coil is located around the portion of one stator tooth.
FIG. 7 shows an auxiliary coil formed from a flexible printed circuit board sheet of another embodiment.

The plurality of stator sheets comprises a plurality of first stator sheets 281 shown in FIG. 5A, and a plurality of second stator sheets 282 shown in FIG. 5B. The first stator sheet 281 has a first number of stator sheet teeth 224, and the second stator sheet 282 has a second number of stator sheet teeth 224. The first number is greater than the second number such that the second stator sheet 282 has one stator tooth less than the first stator sheet 281.

The plurality of second stator sheets 282 is located successively in the stator sheet stack such that said missing teeth of the second stator sheets 282 form the transverse tooth gap 6. In an alternative embodiment, a stator core comprises only one second stator sheet such that a missing stator tooth of the only second stator sheet forms the transverse tooth gap.

FIG. 5C shows a third stator sheet 283. The third stator sheet 283 is a modification of the first stator sheet 281 such that the third stator sheet 283 has three stator sheet teeth 224 less than the first stator sheet 281. By placing at least one third stator sheet 283 between two first stator sheets 281, a stator core is formed having three transverse tooth gaps, each of which is adapted to receive a portion of a corresponding auxiliary coil. In other words, the third stator sheet 283 enables providing a stator core with three auxiliary coils.

FIG. 6A shows a flexible printed circuit board sheet 422 of the auxiliary coil 4 shown in FIG. 3 from a direction perpendicular to a plane defined by the flexible printed circuit board sheet 422. FIG. 6B shows the flexible printed circuit board sheet 422 of FIG. 6A from a direction parallel to the plane defined by the flexible printed circuit board sheet.

FIG. 6C shows the auxiliary coil 4 formed from the flexible printed circuit board sheet 422. In FIG. 6C, the auxiliary coil 4 is located around the portion of one stator tooth 24, and shown from the radial direction which is perpendicular to the axial direction.

The flexible printed circuit board sheet 422 has a plurality of separate conductor members 5 each having a first end 51 at a first end of the flexible printed circuit board sheet 422, and a second end 52 at a second end of the flexible printed circuit board sheet 422. In FIGS. 6A and 6B, each of the separate conductor members 5 extends rectilinearly. In the planar form of the flexible printed circuit board sheet 422 shown in FIGS. 6A and 6B, the separate conductor members 5 are electrically isolated from each other.

FIGS. 6A to 6C show that there is a coil connector printed circuit board 423 electrically conductively connected to the first ends 51 of the plurality of separate conductor members 5. Further, there is a coil output cable 424 electrically conductively connected to coil connector printed circuit board 423. The coil output cable 424 is adapted for electrically conductively connecting the plurality of coil turns of the auxiliary coil 4 to an external electric circuit such as an auxiliary device for which the auxiliary coil 4 is adapted to harvest energy.

The coil connector printed circuit board 423 is a rigid printed circuit board. In an alternative embodiment, the coil connector printed circuit board is a flexible printed circuit board. In a further alternative embodiment, the flexible printed circuit board sheet is directly electrically conductively connected to the coil output cable.

The auxiliary coil 4 is formed by bending the flexible printed circuit board sheet 422 such that the first and second ends of the flexible printed circuit board sheet 422 are adjacent to each other, and electrically conductively connecting the plurality of separate conductor members 5. In an embodiment, electrically conductively connecting the plurality of separate conductor members 5 comprises soldering. FIG. 6B shows solder bumps 71 and solder pads 72 adapted to be soldered together.

FIG. 7 shows an auxiliary coil 4' formed from a flexible printed circuit board sheet 422'. The flexible printed circuit board sheet 422' has been bent into a tubular form, and a plurality of separate conductor members 5' thereof has been electrically conductively connected together in order to form the auxiliary coil 4' having a plurality of coil turns around a centre line of the auxiliary coil 4'. In a complete stator, the centre line of the auxiliary coil 4' is parallel to the radial direction.

In FIG. 7, electrically conductive connection between the separate conductor members 5' comprises coil turn connectors 152'. In an embodiment, the coil turn connectors are provided on the coil connector printed circuit board.

The alternating-current machine shown in FIG. 1 is an induction machine. In alternative embodiments, the machine is of a different type, such as a permanent magnet machine, a synchronous reluctance machine, or a switched reluctance machine. In all embodiments, the stator winding of the electric machine is a known stator winding received in the plurality of stator slots. Stator windings are well-known in the art, and they are not depicted in the Figures.

It will be obvious to a person skilled in the art that the inventive concept can be implemented in various ways. The invention and its embodiments are not limited to the examples described above but may vary within the scope of the claims.

The invention claimed is:

1. A stator for an electric machine comprising:
a stator core having an outer shell, a plurality of stator teeth and a plurality of stator slots, wherein the plurality of stator teeth protrude radially inwards from the outer shell such that each of the plurality of stator slots is defined by adjacent stator teeth, and wherein the plurality of stator slots is adapted to receive a stator winding of the electric machine;
at least one auxiliary coil located adjacent to the stator core, and adapted to generate an auxiliary coil voltage during operation of the electric machine;
wherein the at least one auxiliary coil is located around a portion of one tooth of the plurality of stator teeth such that the portion of the one tooth extends inside the at least one auxiliary coil,
wherein the at least one auxiliary coil is located around the portion of the one tooth such that a dimension of the at least one auxiliary coil in an axial direction is less than a dimension of the one tooth in the axial direction, wherein the axial direction is parallel to a centre axis of the stator core which is adapted to coincide with a rotation axis of the electric machine.

2. The stator according to claim 1, wherein the at least one auxiliary coil comprises a flexible printed circuit board winding having a plurality of coil turns around the portion of the one tooth.

3. The stator according to claim 2, wherein each of the plurality of coil turns is located at the same distance from the portion of the one tooth.

4. The stator according to claim 1, wherein the stator core comprises a plurality of stator sheets stacked in the axial direction, each of the plurality of stator sheets having a plurality of stator sheet teeth such that the plurality of stator teeth is composed of the plurality of stator sheet teeth of the plurality of stator sheets, wherein the plurality of stator sheets comprises at least one first stator sheet having a first number of stator sheet teeth, and at least one second stator sheet having a second number of stator sheet teeth, wherein the first number is greater than the second number such that the at least one second stator sheet provides at least one transverse tooth gap in the one tooth, wherein a portion of the at least one auxiliary coil is received in the at least one transverse tooth gap.

5. The stator according to claim 4, wherein the stator comprises at least one smoothing member between the at least one auxiliary coil and the portion of the one tooth, wherein the at least one smoothing member is adapted to provide a smooth radius for the at least one auxiliary coil between a first lateral portion and a second lateral portion of the at least one auxiliary coil, wherein the first lateral portion and the second lateral portion are located on opposite sides of the portion of the one tooth in a direction perpendicular to both the axial direction and a radial direction.

6. The stator according to claim 1, wherein the stator comprises the stator winding of the electric machine, wherein the stator winding extends in the plurality of stator slots.

7. The stator according to claim 1, wherein the at least one auxiliary coil is adapted to harvest energy for auxiliary devices, or to operate as a sensor.

8. An alternating-current machine comprising:
a frame;
a stator immovably supported to the frame; and a rotor received in the stator, and rotatably supported to the frame,
wherein the stator includes an outer shell, a plurality of stator teeth and a plurality of stator slots, wherein the plurality of stator teeth protrude radially inwards from the outer shell such that each of the plurality of stator slots is defined by adjacent stator teeth, and wherein the plurality of stator slots is adapted to receive a stator winding of the electric machine;
at least one auxiliary coil located adjacent to the stator core, and adapted to generate an auxiliary coil voltage during operation of the electric machine;
wherein the at least one auxiliary coil is located around a portion of one tooth of the plurality of stator teeth such that the portion of the one tooth extends inside the at least one auxiliary coil,
wherein the at least one auxiliary coil is located around the portion of the one tooth such that a dimension of the at least one auxiliary coil in an axial direction is less than a dimension of the one tooth in the axial direction, wherein the axial direction is parallel to a centre axis of the stator core which is adapted to coincide with a rotation axis of the electric machine.

9. A method of manufacturing a stator for an electric machine, wherein the method comprises:
providing a stator core having an outer shell, a plurality of stator teeth and a plurality of stator slots, wherein the plurality of stator teeth protrude radially inwards from the outer shell such that each of the plurality of stator slots is defined by adjacent stator teeth, and wherein the plurality of stator slots is adapted to receive a stator winding of the electric machine; and
providing at least one auxiliary coil adjacent to the stator core, wherein the at least one auxiliary coil is adapted to generate an auxiliary coil voltage during operation of the electric machine,
wherein providing the at least one auxiliary coil adjacent to the stator core includes locating the at least one auxiliary coil around a portion of one tooth of the plurality of stator teeth such that the portion of the one tooth extends inside the at least one auxiliary coil, and
wherein the at least one auxiliary coil is located around the portion of the one tooth such that a dimension of the at least one auxiliary coil in an axial direction is less than a dimension of the one tooth in the axial direction, wherein the axial direction is parallel to a centre axis of the stator core which is adapted to coincide with a rotation axis of the electric machine.

10. The method according to claim 9, wherein providing the at least one auxiliary coil comprises forming a flexible printed circuit board sheet having a plurality of separate conductor members each having a first end at a first end of the flexible printed circuit board sheet, and a second end at a second end of the flexible printed circuit board sheet, bending the flexible printed circuit board sheet such that the first and second ends of the flexible printed circuit board sheet are adjacent to each other, and electrically conductively connecting the plurality of separate conductor members in order to form an auxiliary coil having a plurality of coil turns around a centre line of the auxiliary coil.

11. The method according to claim 9, wherein electrically conductively connecting the plurality of separate conductor members comprises soldering.

12. The method according to claim 10, wherein the at least one auxiliary coil is formed prior to locating the at least one auxiliary coil around the portion of the one tooth.

13. The method according to claim 12, wherein subsequent to the locating the at least one auxiliary coil around the portion of the one tooth, the method comprises pushing at least one smoothing member between the at least one auxiliary coil and the portion of the one tooth.

\* \* \* \* \*